Oct. 13, 1925.

E. ROYER 1,556,880

OXYACETYLENE OR LIKE BLOWPIPE

Filed Sept. 18, 1923 2 Sheets-Sheet 1

Inventor:
Eugène Royer

Oct. 13, 1925.  
E. ROYER  
1,556,880  
OXYACETYLENE OR LIKE BLOWPIPE  
Filed Sept. 18, 1923   2 Sheets-Sheet 2

Inventor  
Eugène Royer

Patented Oct. 13, 1925.

1,556,880

UNITED STATES PATENT OFFICE.

EUGÈNE ROYER, OF LYON, FRANCE, ASSIGNOR TO SOCIETE ANONYME DES CHALUMEAUX E. ROYER, OF LYON, FRANCE.

OXYACETYLENE OR LIKE BLOWPIPE.

Application filed September 18, 1923. Serial No. 663,400.

*To all whom it may concern:*

Be it known that I, EUGÈNE ROYER, a citizen of the French Republic, residing at Lyon, France, have invented certain new and useful Improvements in Oxyacetylene or like Blowpipes, of which the following is a specification.

The blow-pipe which forms the subject of the present invention is particularly intended for work under water at any accessible depth to effect cutting of any metal sheets or members of various thicknesses and shapes. It is notably applicable for work on sunken ships and for similar operations.

A practical form of construction of the invention is illustrated in the accompanying drawing.

Figure 1:
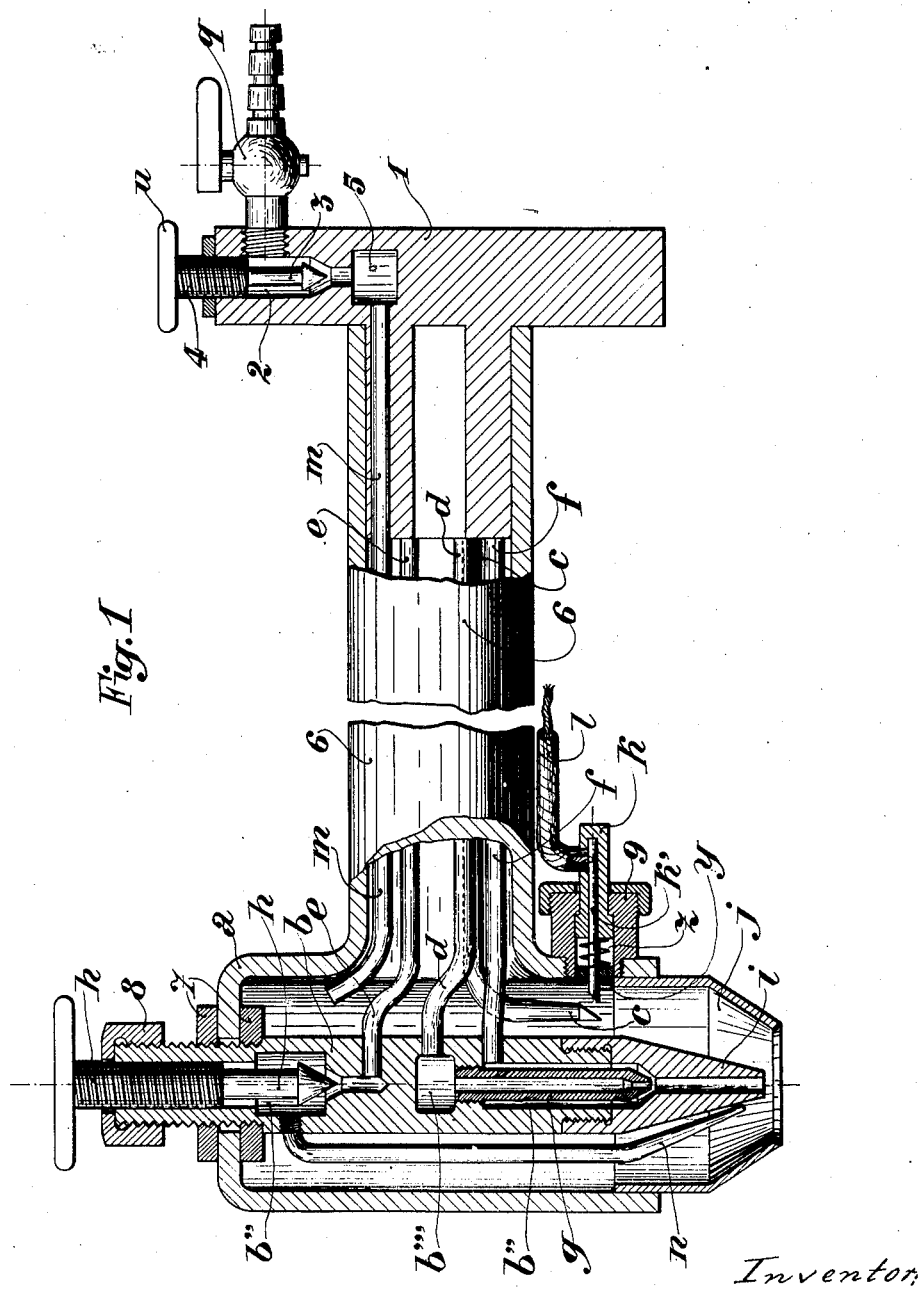
Fig. 1 is a longitudinal axial section of the device.

The apparatus is composed of a particular combination of elements of which one part is placed inside a hollow member $a$ forming the head of the apparatus and which is arranged perpendicularly to one of the ends of a long cylindrical tube 6 forming the handle of the apparatus. The opposite end of this handle carries the other elements of the apparatus and comprises a disc 1 provided with conduits for the distribution of the gases, which conduits communicate with three taps, $p$, $q$, $r$, to which are fitted the pipes supplying these gases which pipes are not illustrated in the drawing.

The tubular member or head $a$ is formed, for instance by the expansion and beating out of one of the ends of the tube 6 forming the handle of the blow-pipe. This head $a$ is open at one end and closed at the other as at $a^1$ the end $a^1$ being provided at the centre with a hole intended to accommodate the threaded end $b^4$ of a nozzle $b$ which is situated on the axis of the head $a$. This nozzle is kept fixed to the head $a$ at the desired height, by the tightening of two nuts 7, which are locked in contrary directions against the end $a^1$.

The threaded end $b^4$ of the said nozzle $b$ is hollowed inside to form a cylindrical chamber $b^1$ of which the upper part is tapped to receive the threaded portion $h^{11}$ of a rod $h^1$ the lower conical end $h$ of which forms a needle-valve adapted to bear on a seat $w$ provided at the lower part of the chamber $b^1$. Through a channel $e^1$ this chamber communicates with a pipe $e$ supplying pure oxygen. Further a tube $n$ starts from said chamber $b^1$ and runs along outside the nozzle $b$ to the conical end $i$ of said nozzle. In the lower part of the nozzle $b$ are two cylindrical chambers $b^{11}$ and $b^{111}$, communicating by an orifice of smaller diameter which is screw-threaded to receive a nozzle tube $g$. This tube extends through the whole length of the chamber $b^{11}$ and its end provided with a calibrated orifice leads into the entrance of an axial channel in a nozzle $i$ which is screwed onto the lower extremity of the jet $b$.

A pipe $d$ leads into the chamber $b^{111}$ and a pipe $f$ leads into the upper part of the chamber $b^{11}$.

The lower part of the head $a$ is laterally provided with a screw threaded hole carrying a member 9 which is axially bored so as to serve as a guide to a slidable tappet $k$ which carries an axial rod $k^1$ the enclosed end of which is connected to an electric conducting wire $l$. The opposite end of this rod $k$ passes through a plug $y$ and projects inside the head $a$. The tappet $k$ is constantly pushed back by a spring $z$ which bears against the fixed plug $y$.

Opposite the projecting end of the conductor rod $k^1$ is the end $c^1$ of the pipe $c$. To this end $c^1$ which is cut obliquely is connected a second current conductor wire which is not shown in the drawing.

The open end of the head $a$ is extended by a conical choke-tube $j$ so mounted that it can be raised or lowered and rendered stationary at a desired height, according as the work requires the mouth of this choke-tube to be level with the end of the nozzle $i$ of the jet $b$ or above or below same. The mounting allowing this adjustment of the tube $j$ is not illustrated.

The aforesaid pipes $e$, $d$, $f$, $c$, are parallel with each other and with the sleeve 6 inside which they are housed, these pipes start from within the disc 1 which is secured to the fore-end of the sleeve 6 by a tongue $1^1$ or by any other means.

Figure 2:
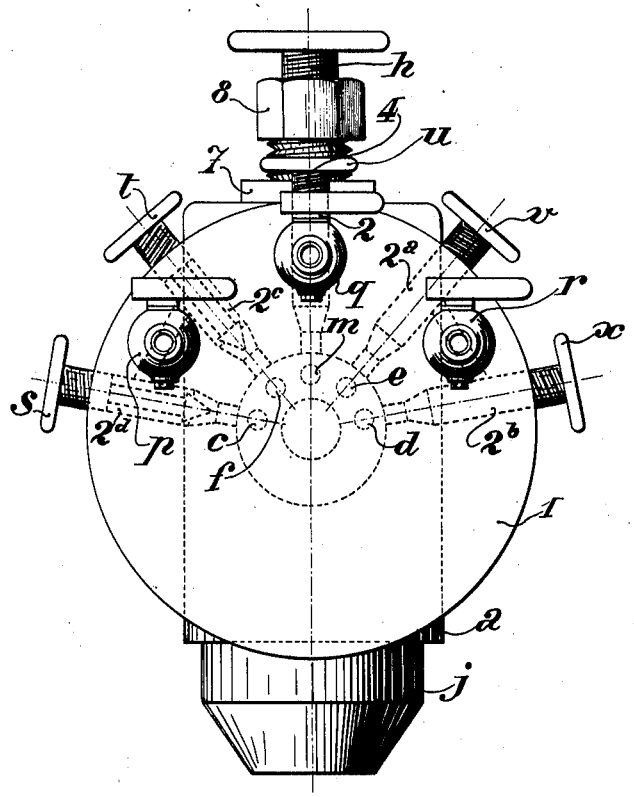
Fig. 2 is an end view of the fore-end thereof to which are connected the pipes for the supply of the gases necessary for working the apparatus.

This disc 1 is provided with five radiating channels 2, $2^a$, $2^b$, $2^c$, $2^d$, which are each throttled at one point of their length in order to form the seats for a needle valve screwed into the disc 1 by screw-threaded members 4 terminated by milled heads in order to be worked by hand. The lower ends of said channel form chambers 5 to which the respective pipes $c, f, m, e, d$ are connected. The five needle-valves are referred to by the letters $s, t, u, v, x$ (Fig. 2).

The pipes $e, d$, correspond to the channels $2^a, 2^b$ and the pipes $f, c$, correspond to the channels $2^c$ $2^d$. A pipe $m$ corresponds to the channel 2, which pipe also runs along the sleeve 6 and leads into the interior of the head $a$, Fig. 1.

The channel 2 is put by means of a tap $q$ into communication with a pipe supplying compressed air. The channels $2^a, 2^b$ communicate with each other through a transverse channel 10 on which is soldered a tap $r$ to which a pipe supplying pure oxygen is connected. The channels $2^c, 2^d$ communicate in the same manner by a channel 11 into which acetylene gas is fed regulated by the valve $p$.

The taps $p, q, r$ serve for initial regulation of the supply of the respective fluids and the needle-valves $u, v, x, s, t$, are intended for further regulation of the supply into the pipes $m, e, d, f, c$. The supply of pure oxygen into the chamber $b^1$ and finally to the jet $n$ is regulated a third time and finally by the needle valve $h, h^1$.

The working of the apparatus is as follows:—

In the first place the compressed air tap $q$ and the needle valve 3 are open at the immersion of the apparatus while the taps $p, r$ remain shut, it follows that during the conveyance of the apparatus through the water and during the whole period of working under water, the compressed air continually arrives inside the head $a$ and passes out through the choke-tube $j$ thus preventing the entrance of any water into the head $a$ and removing the water from any contact with the metal during the cutting operation as known.

In the second place, the diver who manipulates the pipe opens the taps, $p, r$ and then operates the needle-valves $s, t, v, x$ to effectuate an initial regulation of the supply of the fluids in the pipes $e, d, f, c$. Then he forces in the tappet $k$ so that its rod $k^1$ enters into contact with the end $c^1$ of the tube $c$ and closes the electric circuit. This tappet is then suddenly let go in order to produce a spark which ignites the acetylene gas issuing from the pipe $c$. The flame which results therefrom lengthens under the action of the compressed air passing into the head $a$ and this lengthened flame produces in its turn the ignition of the oxyacetylene mixture issuing through the nozzle $i$.

According to the thickness and nature of the metal to be cut, the respective intensities of the central flame and of the lateral cutting jet are regulated by the operator by actuating the inlet valves of the fluids to the required extent.

The height of the choke-tube $j$ is regulated according to the cutting work to be done.

The blow-pipe is moved by the operator in its plane and parallel with its longitudinal axis, in the direction of the arrow in Fig. 1, so that the metal may be first attacked by the flame from the combustion of the mixture issuing at $i$ and then by the jet of pure oxygen from the pipe $n$.

The arrangements of the constituent elements of the pipe, their dimensions and shapes may vary to a considerable degree, without the principle of the invention being altered. The nature of the gases or fluids employed as well as the number thereof may also vary and consequently the number of pipes and distribution and regulation valves for said gases or fluids.

The blow pipe described can work in the open air but in this case the head $a$ is removed or the supply of compressed air to this head is dispensed with.

The apparatus possesses the following main advantages.

1. The ignition of the gaseous mixture issuing through the nozzle $i$ is absolutely certain, it can be effected at will and any number of times, when the pipe is immersed in the water, by the simple manipulation of the tappet $k$ situated inside the head $a$ which causes the formation of sparks igniting the acetylene gas supplied through the burner $c^1$, this flame causing the ignition of the gaseous mixture supplied through the nozzle $i$.

2. The gases passing into the compartments $b^{11}, b^{111}$ mingle very near their outlet and thus produce a highly oxidant flame fusing metal even of great thickness in a very short time.

3. The needle-valve $h$ ensures a complete and exact regulation of the supply of pure oxygen or other fluid feeding the cutting jet $n$ situated eccentrically with regard to the nozzle $i$.

4. The suitable gases or fluids feeding the pipe arrive in the chambers $b^1$ and $b^{11}, b^{111}$ in proportions and quantities determined by the successive regulations by the taps $p, r$ and the needle-valves, $s, t, v, x$, forming a handy group mounted on the disc $l$ forming the fore-end of the apparatus.

5. The jet $b$ being of regulatable height and the choke tube $j$ being also adjustable with respect to the head $a$ allows the variation of the relative positions of said jet $b$ and choke-tube $j$ according to the work to be done.

6. The apparatus is not cumbersome, is of minimum weight and all the regulating members are within immediate reach of the operator's hands.

What I claim as my invention and desire to secure by Letters Patent of the United States is:—

1. A multiple gas blow-pipe comprising a tubular member, a cylindrical head open at one end and closed at the other integral with one of the ends of said member and arranged at right angles thereto, means for extending the length of said cylindrical head a disk at the other end of said member, a nozzle in said head, means for adjusting said nozzle axially of said head, a second nozzle adjacent thereto, means for conveying gases to said nozzles, a third nozzle arranged in said first nozzle means for conveying gas thereto, means for producing an electric spark at the outlet of said third nozzle and means comprised in said disk for regulating the supply of gases to said nozzles.

2. A multiple gas blow-pipe comprising a tubular member, a cylindrical head open at one end and closed at the other, integral with one of the ends of said member and arranged at right angles thereto, means for extending the length of said cylindrical head a disk at the other end of said member, a nozzle in said head, means for adjusting said nozzle axially of said head, a second nozzle adjacent thereto, means for conveying gases to said nozzles, a third nozzle in said head, means for conveying gas thereto, means for producing an electric spark at the outlet of said third nozzle, a plurality of taps connected to said disk, a first pair of adjustable needle valves, an intermediate needle valve and a second pair of needle valves carried by said disk means connecting said first pair of adjustable needle valves to one of said taps, means connecting said second pair of needle valves to another of said taps, means connecting said intermediate needle valve to another of said taps, pipes connecting the respective needle valves of said first mentioned pair to said concentric and said second nozzle, pipes connecting the respective needle valve of said second mentioned pair to said first nozzle and to said head, and a pipe connecting said intermediate needle valve to said head.

3. A multiple gas blow-pipe comprising a tubular member, a tubular head open at one end and closed at the other, integral with one of the ends of said member and arranged at right angles thereto, a disk at the other end of said member, a nozzle member mounted concentrically in said head and having an upper chamber provided with a valve seat, an intermediate and a lower chamber, a nozzle passage extending from said lower chamber to the base of said nozzle member, means for adjusting said nozzle member in said head, a valve adapted to be moved towards or away from said valve seat, a nozzle extending from said intermediate chamber into said lower chamber and forming with the latter an annular space, a nozzle tube extending from said upper chamber along the outside of said nozzle member and having its outlet adjacent the outlet of said nozzle passage, pipes extending within said tubular member from said chambers in said nozzle member to valve chambers in said disk, valves regulating the passage of gases through said pipes, a pipe extending from a chamber in said disk to said head, and conveying compressed air thereto, a valve in said disk for regulating the supply of compressed air, an electrically conductive pipe extending from a chamber in said disk to said head, an electrically conductive spring governed plunger mounted in the side wall of said head, means for conveying electric current thereto, and a slidable extension mounted within the open end of said head.

In witness whereof I have signed this specification.

EUGÈNE ROYER.